United States Patent
Khenkin et al.

(10) Patent No.: US 11,206,502 B1
(45) Date of Patent: Dec. 21, 2021

(54) SYSTEM AND METHOD FOR EVALUATING AN EAR SEAL USING NORMALIZATION

(71) Applicant: Cirrus Logic International Semiconductor Ltd., Edinburgh (GB)

(72) Inventors: Aleksey S. Khenkin, Austin, TX (US); Yukuh Tung, Mesa, AZ (US)

(73) Assignee: Cirrus Logic, Inc., Austin, TX (US)

(*) Notice: Subject to any disclaimer, the term of this patent is extended or adjusted under 35 U.S.C. 154(b) by 0 days.

(21) Appl. No.: 17/090,242

(22) Filed: Nov. 5, 2020

Related U.S. Application Data

(60) Provisional application No. 63/039,988, filed on Jun. 17, 2020.

(51) Int. Cl.
  H04R 1/10 (2006.01)
  H04R 29/00 (2006.01)
  (Continued)

(52) U.S. Cl.
  CPC ........... H04R 29/001 (2013.01); G06F 3/165 (2013.01); G10L 25/51 (2013.01); H04R 1/1016 (2013.01);
  (Continued)

(58) Field of Classification Search
  CPC .. H04R 29/001; H04R 1/1016; H04R 1/1041; G06F 3/165; G10L 25/51
  See application file for complete search history.

(56) References Cited

U.S. PATENT DOCUMENTS

| | | | |
|---|---|---|---|
| 11,115,750 B2 * | 9/2021 | Monsarrat-Chanon | ..................... H04R 1/1016 |
| 2009/0220096 A1 * | 9/2009 | Usher | .................... H03G 9/005 381/57 |

(Continued)

FOREIGN PATENT DOCUMENTS

| JP | 2012244522 A | 12/2012 |
|---|---|---|
| WO | WO 2009023633 | 2/2009 |

OTHER PUBLICATIONS

Schulein, Robert B. et al. "In situ Subjective and Objective Acoustic Seal Performance Test for Insert Earphones." AES Convention 141, AES 60 East 42nd Street, Room 2520, New York 10165-2520. Sep. 20, 2016. pp. 1-8.

*Primary Examiner* — Simon King
(74) *Attorney, Agent, or Firm* — E. Alan Davis; James W. Huffman

(57) ABSTRACT

A system for evaluating an ear seal between an earphone of a hearing device and an ear canal includes a first transducer that plays sound in response to an electrical signal that includes a reference frequency component and a test frequency component lower than the reference frequency. A second transducer receives the sound in the ear canal. A controller is configured to: calculate at least one electrical signal level difference between the electrical signal reference and test frequency components, measure acoustical levels of the reference and test frequency components of the sound in the ear canal, calculate an acoustical signal level difference between the measured acoustical levels of the (Continued)

reference and test frequency components, calculate a normalized acoustical difference value by subtracting the electrical signal level difference from the acoustical signal level difference, and determine a measurement of the ear seal based on the normalized acoustical difference value.

23 Claims, 5 Drawing Sheets

(51) Int. Cl.
   *G10L 25/51* (2013.01)
   *G06F 3/16* (2006.01)
(52) U.S. Cl.
   CPC ....... *H04R 1/1041* (2013.01); *H04R 2460/15* (2013.01)

(56) References Cited

U.S. PATENT DOCUMENTS

| | | | | |
|---|---|---|---|---|
| 2010/0074451 | A1* | 3/2010 | Usher | H04R 1/1091 381/58 |
| 2014/0241553 | A1* | 8/2014 | Tiscareno | H04R 5/033 381/309 |
| 2014/0247952 | A1* | 9/2014 | Goldstein | H04R 1/1083 381/74 |
| 2016/0249128 | A1 | 8/2016 | Goldstein | |
| 2019/0274595 | A1* | 9/2019 | Usher | G06F 3/165 |
| 2019/0313196 | A1 | 10/2019 | Usher | |
| 2020/0162808 | A1* | 5/2020 | Monsarrat-Chanon | H04R 25/305 |

\* cited by examiner

SYSTEM AND METHOD FOR EVALUATING AN EAR SEAL USING NORMALIZATION

CROSS REFERENCE TO RELATED APPLICATION(S)

This application claims priority based on U.S. Provisional Application, Ser. No. 63/039,988, filed Jun. 17, 2020, entitled System and Method for Evaluating an Ear Seal using Normalization, which is hereby incorporated by reference in its entirety.

BACKGROUND

In order to reduce power consumption, many personal audio devices have a dedicated "in-ear detect" function, operable to detect the presence or absence of an ear in proximity to the device. Additionally, specific for in-ear transducers (earphones), for some applications there is a need to evaluate the quality of the seal formed between the earphone and the ear canal. For example, the playback quality, in particular the bass response, is affected by the quality of the seal formed between the earphone and the ear canal. Additionally, in the realm of ear biometrics, the ear canal impulse response (ECIR) is affected by the insertion quality.

Infra-red sensors have been used in mobile phones to detect the proximity of an ear. Light sensors have been proposed to detect the insertion of earphones and headphones into or onto a user's ears. However, these non-acoustical mechanisms suffer from the drawback that they require additional hardware in the device. Furthermore, they cannot assess the seal/insertion quality.

Measuring transducer (e.g., receiver) impedance is an acoustical method that can be used to detect ear in/out status of a device, but not seal quality. It is also possible to use very low frequency (e.g., 5 Hz) probe sounds, requiring direct measurements of the sound levels at these frequencies. Such measurements, in addition to requiring specific probe signals to be generated, suffer from high noise levels and microphone response inaccuracies.

SUMMARY

In one embodiment, the present disclosure provides a system for evaluating an ear seal between an earphone of a hearing device and an ear canal that includes a first transducer configured to play sound into the ear canal in response to an electrical signal, wherein the electrical signal includes a reference frequency component and at least one test frequency component. The sound includes a reference frequency component and at least one test frequency component. The at least one test frequency is lower than the reference frequency. A second transducer is configured to receive the sound in the ear canal. A controller is configured to: calculate at least one electrical signal level difference between the reference frequency component and the at least one test frequency component of the electrical signal, measure acoustical levels of the reference frequency component and the at least one test frequency component of the sound in the ear canal, calculate at least one acoustical signal level difference between the measured acoustical level of the reference frequency component and the measured acoustical level of the at least one test frequency component, calculate at least one normalized acoustical difference value by subtracting the electrical signal level difference from the at least one acoustical signal level difference, and determine a measurement of the ear seal based on the at least one normalized acoustical difference value.

In another embodiment, the present disclosure provides a method for evaluating an ear seal between an earphone of a hearing device and an ear canal. The method includes playing, by a first transducer of the earphone, sound into the ear canal in response to an electrical signal. The electrical signal includes a reference frequency component and at least one test frequency component. The sound includes a reference frequency component and at least one test frequency component. The at least one test frequency is lower than the reference frequency. The method also includes calculating at least one electrical signal level difference between the reference frequency component and the at least one test frequency component of the electrical signal, measuring acoustical levels of the reference frequency component and the at least one test frequency component of the sound in the ear canal received by a second transducer of the earphone, calculating at least one acoustical signal level difference between the measured acoustical level of the reference frequency component and the measured acoustical level of the at least one test frequency component, calculating at least one normalized acoustical difference value by subtracting the electrical signal level difference from the at least one acoustical signal level difference, and determining a measurement of the ear seal based on the at least one normalized acoustical difference value.

In yet another embodiment, the present disclosure provides a non-transitory computer-readable medium having instructions stored thereon that are capable of causing or configuring a system for evaluating a seal between an earphone of a hearing device and an ear canal or ear cavity to perform operations. The operations include playing, by a first transducer of the earphone, sound into the ear canal in response to an electrical signal. The electrical signal includes a reference frequency component and at least one test frequency component. The sound includes a reference frequency component and at least one test frequency component. The at least one test frequency is lower than the reference frequency. The method also includes calculating at least one electrical signal level difference between the reference frequency component and the at least one test frequency component of the electrical signal, measuring acoustical levels of the reference frequency component and the at least one test frequency component of the sound in the ear canal received by a second transducer of the earphone, calculating at least one acoustical signal level difference between the measured acoustical level of the reference frequency component and the measured acoustical level of the at least one test frequency component, calculating at least one normalized acoustical difference value by subtracting the electrical signal level difference from the at least one acoustical signal level difference, and determining a measurement of the ear seal based on the at least one normalized acoustical difference value.

DETAILED DESCRIPTION

Figure 1:
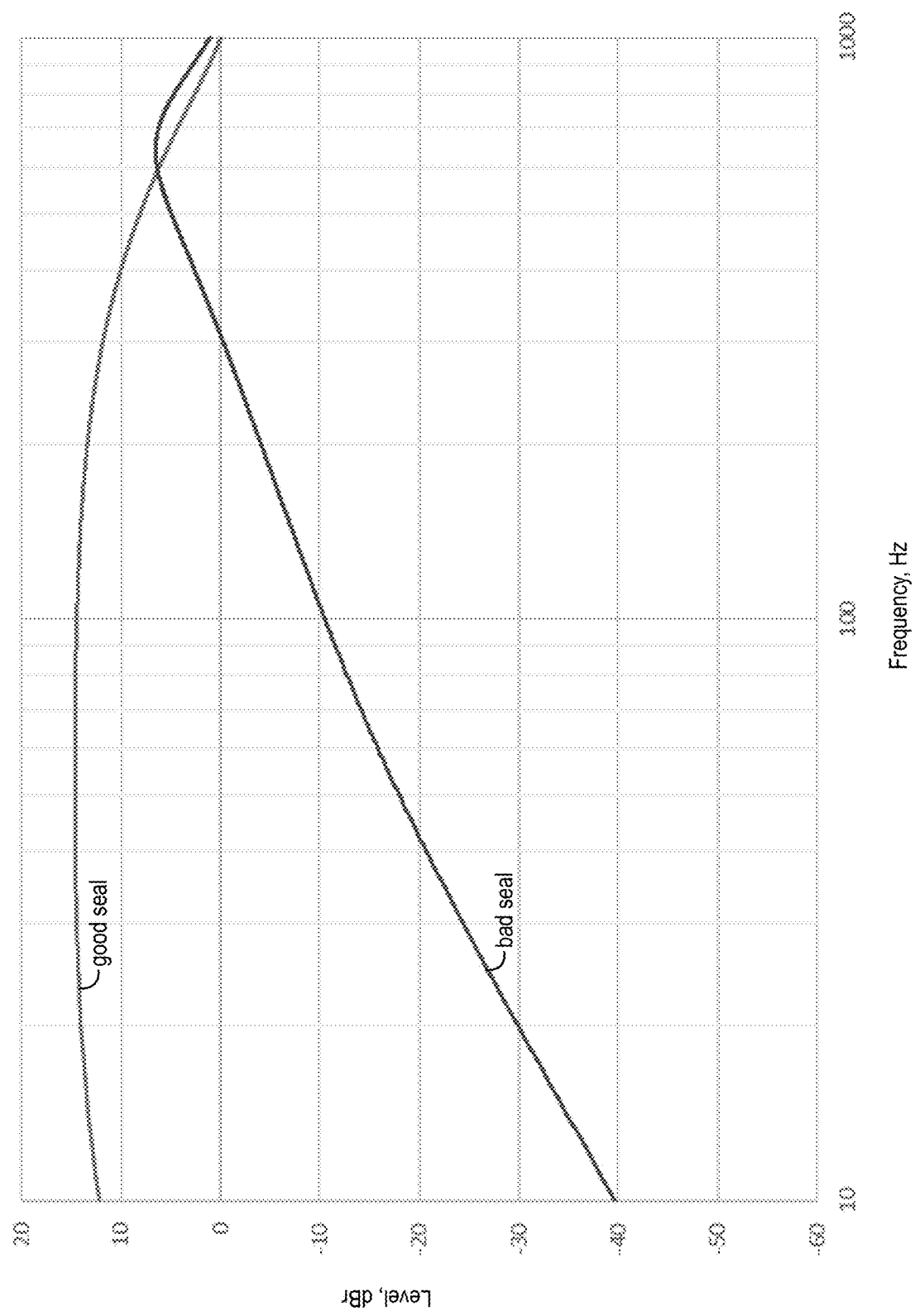
FIG. 1 is an example graph illustrating good ear seal and bad ear seal sound levels measured across a frequency spectrum in accordance with embodiments of the present disclosure.

FIG. 1 is an example graph illustrating good ear seal and bad ear seal sound levels measured across a frequency spectrum in accordance with embodiments of the present disclosure. In the graph of FIG. 1, the sound levels are measured in decibels relative to a reference signal (dBr), and the frequency range is from 10 Hz to 1000 Hz. As may be observed from the graph, in the case of a bad ear seal, there is approximately a logarithmic relationship between the response and the frequency, whereas in the case of a good ear seal, there is an approximate linear relationship between the response and the frequency. Thus, for example, the response at lower frequencies (e.g., audio range bass response) is detrimentally affected by a bad ear seal relative to the response in the case of a good ear seal. FIG. 1 illustrates an example of uses for determining the ear seal quality, e.g., to inform the system to boost low frequencies in the case of a poor ear seal and/or to inform the user of the poor seal. Furthermore, there are other uses for determining the quality of an ear seal, as described herein, and for determining whether the earphone is inserted in the user's ear canal at all.

Embodiments are described in which a system uses a lower-frequency region of wideband program material spectrum to assess both the in/out position of an earbud as well as ear seal quality. Sound levels at one or more low frequencies (LF), referred to herein as test frequencies, are measured relative to at least one higher frequency (HF), referred to herein as reference frequency, using an electrical program signal difference as a normalization reference. Take as an example a LF test frequency of 100 Hz (e.g., see FIG. 3) and a HF reference frequency of 1 kHz. The electrical signal level difference between 100 Hz and 1 kHz is known and independent of the earbud position and seal quality. Thus, a reference level can be recorded to be used for acoustical measurements. The acoustical level difference between 100 Hz and 1 kHz, measured by a microphone inside the ear canal (e.g., error microphone of an earphone), depends upon the earphone position and seal quality, and therefore can be used to evaluate the seal quality when normalized to the electrical signal level difference. More than one test frequency and more than one reference frequency may be used to obtain greater discrimination of the ear seal quality under various conditions. For example, a normalized acoustical difference between levels at a reference frequency and multiple test frequencies can be used together to improve confidence in the normalized acoustical difference used to determine the ear seal quality. Finally, threshold values, e.g., for each test frequency, for the difference indicating "earbud out" may be established.

Figure 2:
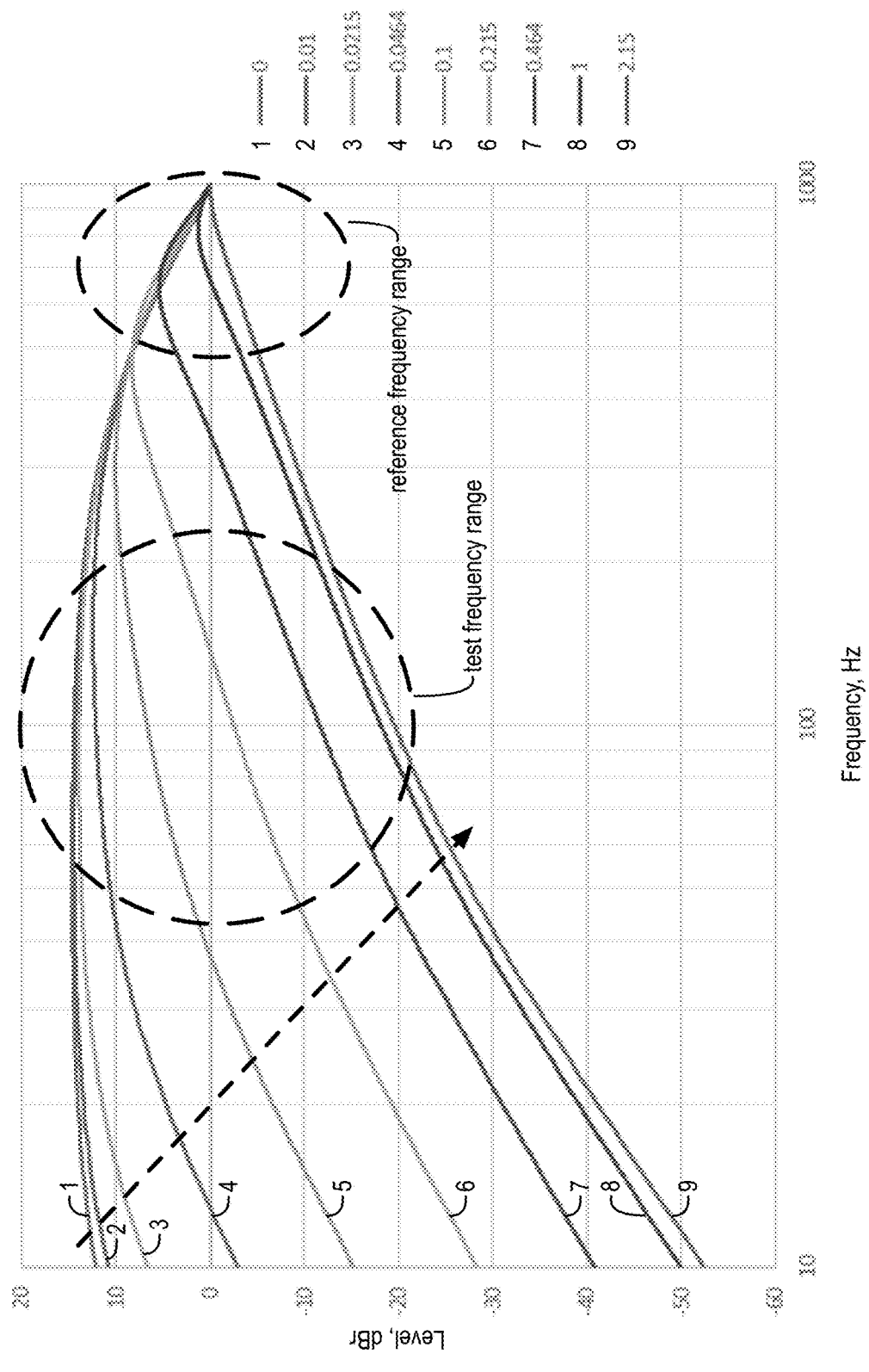
FIG. 2 is an example graph illustrating normalized acoustical difference levels across a test frequency spectrum relative to a reference frequency for different ear seal leak sizes in accordance with embodiments of the present disclosure.

FIG. 2 is an example graph illustrating normalized acoustical difference levels across a test frequency spectrum relative to a reference frequency for different ear seal leak sizes in accordance with embodiments of the present disclosure. The different leak sizes shown are measured in millimeters. The leak size may vary around the circumference of the ear canal since the ear canal and earphone shape do not match perfectly. Normalized acoustical difference level curves are shown for leak sizes of 0, 0.01, 0.0215, 0.0464, 0.1, 0.215, 0.464, 1 and 2.15 millimeters. The levels are measured in decibels relative to a reference signal (dBr), and the frequency range is from 10 Hz to 1000 Hz. The measured sound is generated by a speaker of an earphone of a hearing device and received at an internal (e.g., error) microphone of the hearing device. The normalized acoustical difference level information may be generated in various manners. For example, stored or streamed program material, e.g., music having diverse levels across the audio frequency spectrum, may be driven into the speaker and measured at the internal microphone; the level of the electrical signal driven into the speaker may be analyzed over the frequency spectrum of interest (e.g., 10 Hz to 1000 Hz of FIG. 2); the acoustical level at the microphone may be analyzed over the frequency spectrum; the difference between the reference frequency (e.g., 1000 Hz) level and each of the other frequencies in the spectrum may be calculated for both the electrical signal level and the acoustical level; and a normalized acoustical difference level may be calculated for each of the other frequencies as a difference of the acoustical level difference and the electrical signal level difference. For another example, a tone could be swept across the frequency spectrum of interest (including the reference frequency), and a similar set of measurements and calculations could be performed to generate a normalized acoustical difference level for each of the frequencies in the spectrum. In such an example, in the special case that the level of the electrical signal is the same for the reference frequency and for all the other frequencies, then the electrical signal level difference is zero, and the normalization of the acoustical difference level involves subtracting zero from the acoustical difference level.

As may be observed from FIG. 2, a strong leak dependence in the spectral shape of the normalized acoustical difference level is evident across a significant portion of the frequency spectrum. In one embodiment, the frequency range between 50 Hz and 200 Hz offers a clear signature, particularly at all but the two ends of the leak size range. The normalized acoustical difference information that is specific to a given earphone model may be established via an ear simulator or volunteer subject measurements, for example, and used for determining an ear seal measurement, as described in more detail below. That is, although the normalized acoustical difference information may vary for different earphone designs, the separation of normalized acoustical difference for a given frequency relative to a reference frequency for a given frequency observed in FIG. 2 is typical. In particular, an increase in leak size corresponds to a smaller normalized acoustical difference, as shown, which may be used to evaluate the ear seal quality. Finally, a threshold value for the normalized acoustical difference level that indicates an "earbud out" condition may be established.

Figure 3:
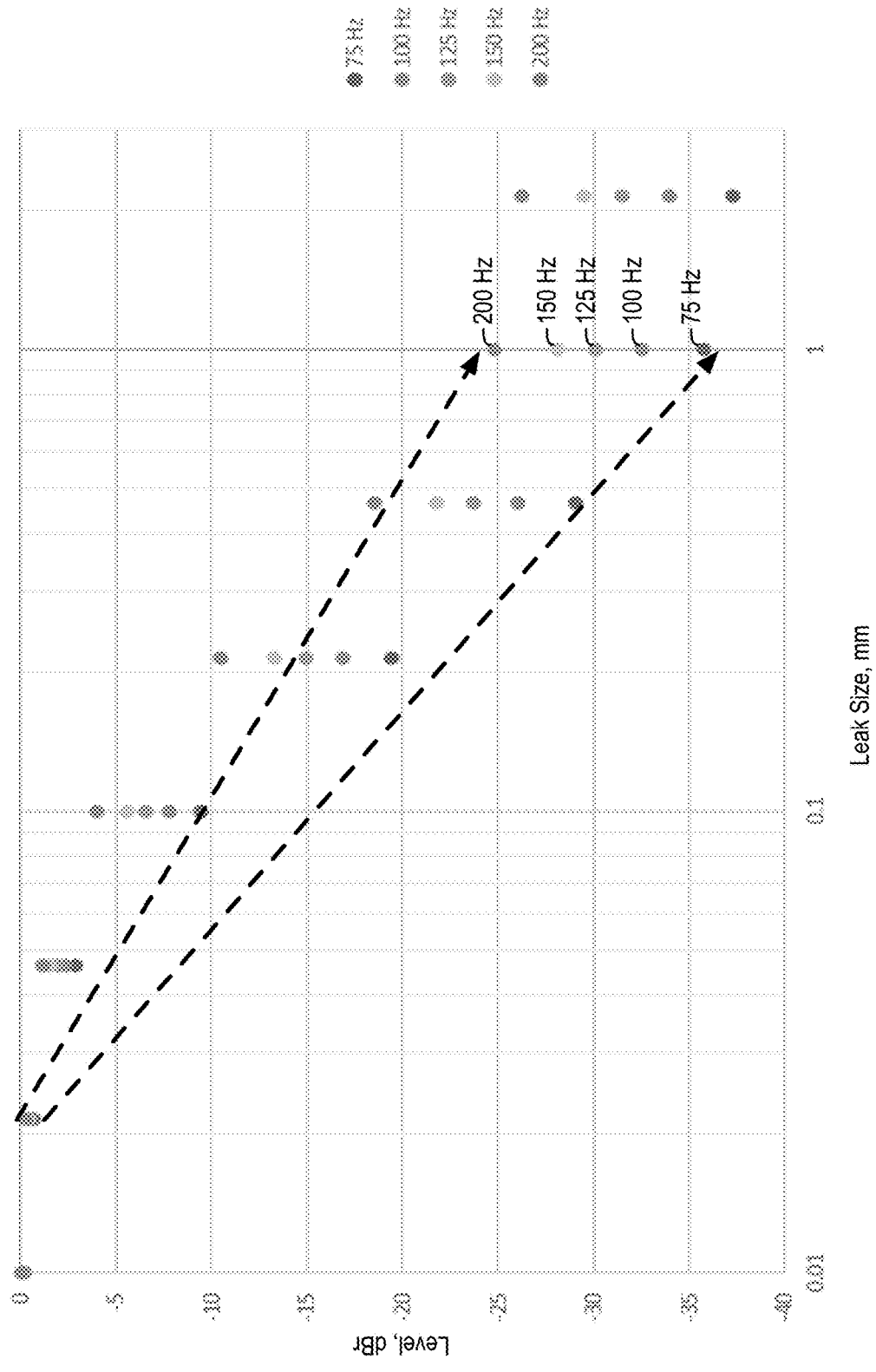
FIG. 3 is an example graph illustrating normalized acoustical difference levels for different ear seal leak sizes at selected frequencies in accordance with embodiments of the present disclosure.

FIG. 3 is an example graph illustrating normalized acoustical difference levels for different ear seal leak sizes at selected frequencies in accordance with embodiments of the present disclosure. More specifically, FIG. 3 plots the normalized acoustical difference (in dBr) as a function of the eight different ear seal leak sizes of FIG. 2 (excluding the zero-leak case) for each of five different frequencies, namely 75, 100, 125, 150 and 200 Hz. Trend lines are shown with dashed arrows for the 75 and 200 Hz values. The values plotted in FIG. 3 are normalized, at each frequency shown, to the zero-leak level. That is, the level of the zero-leak response is made the 0 dBr level at each frequency of interest. This has the effect of taking out the greater than 10 dBr "bump" observable in FIG. 2 at some frequencies and making it flat at the 0 dBr level. Thus, FIG. 3 shows the difference between the zero-leak and non-zero-leak responses at each of the selected frequencies and illustrates the abilities of the embodiments to determine the ear seal quality, earphone insertion depth and/or "earphone out" status. As may be observed in FIG. 3, there is a general trend of an increasing spread in normalized acoustical difference as ear seal leak size increases.

Figure 4:
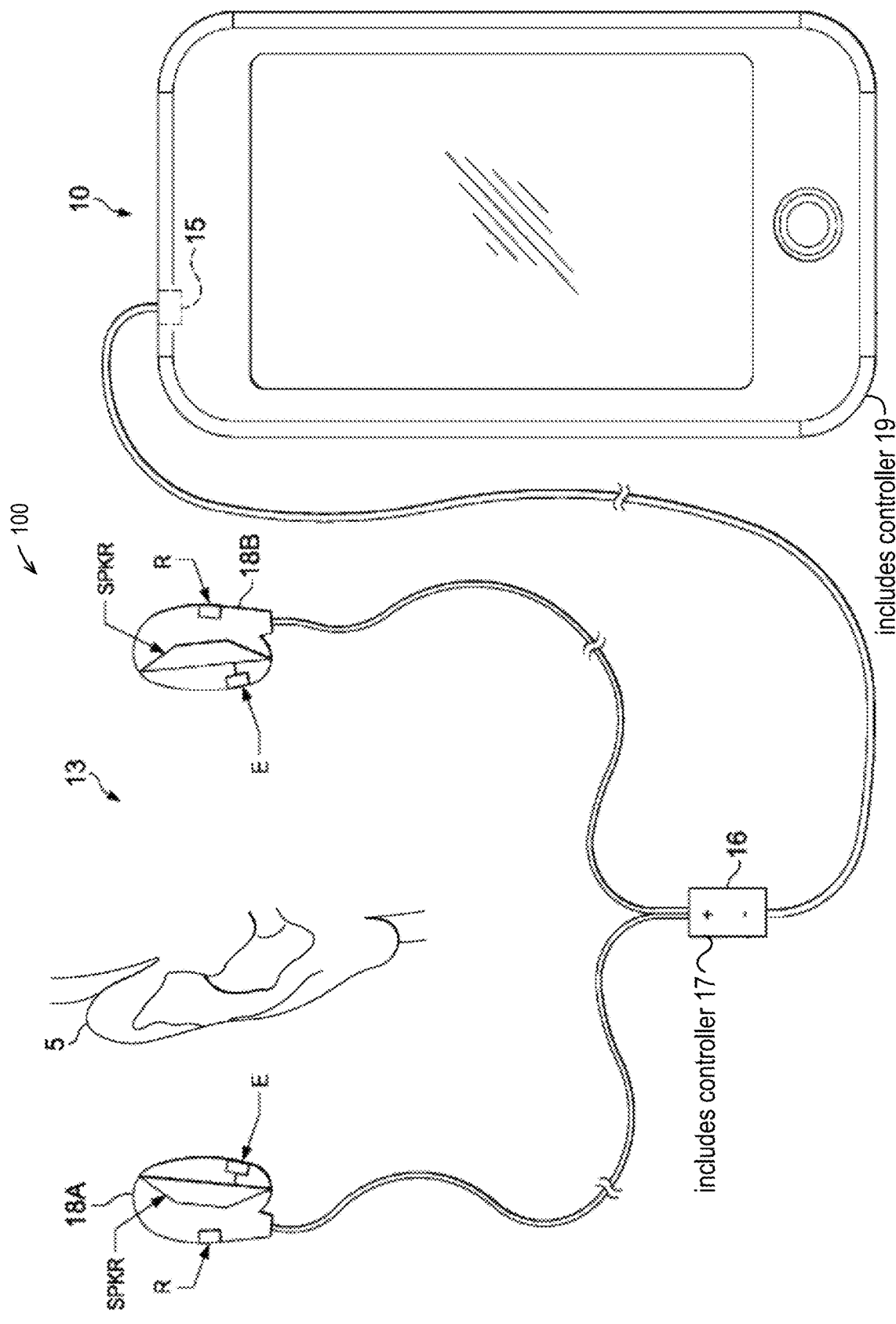
FIG. 4 is an example block diagram of a system that may be employed to evaluate an ear seal using normalization in accordance with embodiments of the present disclosure.

FIG. 4 is an example system 100 that may be employed to evaluate an ear seal using normalization in accordance with embodiments of the present disclosure. The system 100 includes a hearing device 13 coupled with a portable audio device 10, such as a mobile telephone or other audio device. The hearing device 13 may include a combox 16, a left earphone 18A, and a right earphone 18B. The left earphone 18A is shown in proximity to a human ear 5 for insertion therein, and the right earphone 18B is for insertion in the other ear (not shown). As used in this disclosure, the term "earphone" broadly includes any loudspeaker, internal microphone, external microphone and structure associated therewith that is intended to be inserted within a listener's ear canal or otherwise acoustically coupled to same, and includes without limitation earphones, earbuds, headsets and other similar devices that may be inserted into a human ear canal or otherwise acoustically coupled to same. Furthermore, it should be understood that the embodiments described herein may be used to determine ear seal quality for earphones of various different shapes, sizes and styles.

Each of the earphones 18A and 18B (referred to generically as earphone 18 and collectively as earphones 18) includes a reference microphone R, an error microphone E and a speaker SPKR. When the earphone 18 is inserted into an ear canal, the reference microphone R is external to the ear canal and the error microphone E is internal to the ear canal. The reference microphone R, also referred to as the external microphone, measures the ambient, or external, acoustic environment. The error microphone E, also referred to as the internal microphone, measures the attenuated ambient audio within the ear canal combined with the audio reproduced by the speaker SPKR. The speaker SPKR may reproduce distant speech received by mobile audio device 10, along with other local audio events such as ringtones, stored or streamed audio program material, injection of near-end speech (i.e., the speech of the user of mobile audio device 10) to provide a balanced conversational perception, and other audio that requires reproduction by mobile audio device 10, such as sources from webpages or other network communications received by mobile audio device 10 and audio indications such as a low battery indication and other system event notifications.

The hearing device 13 may include a controller 17, e.g., in the combox 16 or within one or both of the earphones 18, that performs various operations or functions described herein to determine ear seal quality using sound levels measured on the error (internal) microphone E at test and reference frequencies. The operations may include measuring sound levels at the error microphone E at the reference and test frequencies, calculating an acoustical difference between the measured sound levels, calculating a difference between the test and reference frequency components of the electrical signal used to drive the speaker SPKR to generate the sound, calculating a normalized acoustical signal difference based on the acoustical difference and the electrical signal difference, and determining the ear seal quality based on the normalized acoustical difference. The controller 17 may also perform actions based on the determined ear seal quality that may improve the listening experience for the user of the hearing device 13. The controller 17 may include a processing element that fetches and executes program instructions. The controller 17 may also include volatile and non-volatile memory for storing data and program instructions executable by the controller 17. The controller 17 may also include an audio coder/decoder (CODEC) circuit (not shown) that receives the signals from reference microphone R and error microphone E and generates the electrical signals to the speaker SPKR.

The audio device 10 also includes a controller 19 that may perform some of the operations to determine the ear seal quality and/or perform actions based on the determined ear seal quality that may improve the listening experience for the user. The controller 19 may be included in an integrated circuit (IC) of the audio device 10. The controller 19 may also include an audio CODEC circuit and volatile and non-volatile memories (not shown). The audio device 10 may include an audio port 15 for connecting to the hearing device 13. The audio port 15 may be communicatively coupled to a radio frequency (RF) circuit (not shown) and the controller 19 within the audio device 10, thus permitting communication with components of the hearing device 13. The RF circuit may include a wireless telephone transceiver. In other embodiments, the hearing device 13 may connect wirelessly to the mobile audio device 10, e.g., via Bluetooth or other short-range wireless technology.

The hearing device 13 and/or mobile audio device 10 may include acoustic noise cancellation (ANC) circuits and features that inject an anti-noise signal into speaker SPKR to improve intelligibility of the distant speech and other audio reproduced by speaker SPKR. In general, the ANC system measures ambient acoustic events (as opposed to the output of speaker SPKR and/or near-end speech) impinging on reference microphone R, and by also measuring the same ambient acoustic events impinging on error microphone E, ANC processing circuits adapt an anti-noise signal generated using the output of reference microphone R to have a characteristic that minimizes the amplitude of the ambient acoustic events at error microphone E. In some embodiments, the hearing device 13 and/or audio device 10 may also include a near speech microphone that may be employed in ANC operation.

In some embodiments of the disclosure, the circuits and techniques disclosed herein may be incorporated in a single integrated circuit that includes control circuits and other functionality for implementing the hearing device 13 and/or the portable audio device 10, such as an MP3 player-on-a-chip integrated circuit. In these and other embodiments, the circuits and techniques disclosed herein may be implemented partially or fully in software and/or firmware embodied in computer-readable media and executable by a controller or other processing device, such as a controller that may perform operations as described herein. The controller may include an electronic circuit capable of fetching program instructions stored in addressed memory locations and executing the fetched instructions. The IC may also include a non-volatile memory for storing threshold values as described in more detail below.

Figure 5:
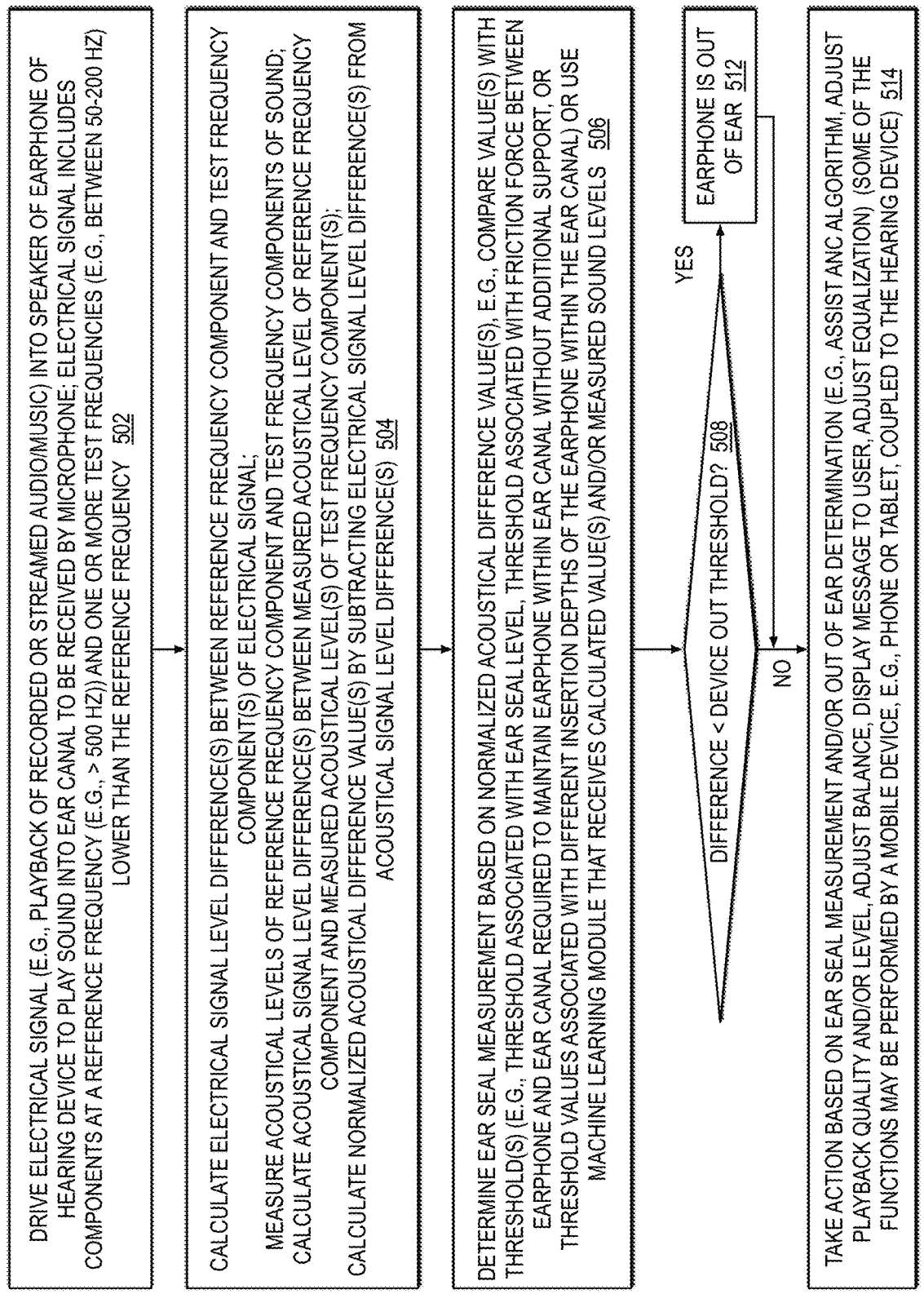
FIG. 5 is an example flowchart illustrating operation of a system that evaluates an ear seal using normalization in accordance with embodiments of the present disclosure.

FIG. 5 is an example flowchart illustrating operation of a system, e.g., system 100 of FIG. 4, that evaluates an ear seal using normalization in accordance with embodiments of the present disclosure. The operations described are performed for each of the earphones 18 of a hearing device 13. Operation begins at block 502.

At block 502, an electrical signal is driven into a transducer (e.g., speaker SPKR of FIG. 4) of an earphone (e.g., earphone 18 of FIG. 4) of a hearing device (e.g., hearing device 13 of FIG. 4) to play sound into an ear canal of a user of the hearing device. The sound is received by an internal microphone (e.g., error microphone E of FIG. 4) of the hearing device. The electrical signal may comprise a recorded or streamed audio signal, e.g., music, that is played back through the transducer. The electrical signal includes a component at the reference frequency and components at one or more test frequencies. The test frequencies are lower than the reference frequency. Preferably, the reference frequency is greater than 500 Hz and the test frequencies are within a range of 50-200 Hz. Because the sound and the electrical signal used to produce the sound may have a diverse frequency content, the system may extract, or isolate, the signal power of the sound and electrical signal at the desired reference frequency and test frequency or frequencies. In one embodiment, a Fast Fourier Transform (FFT) is performed on the sound and/or electrical signal to obtain frequency bins that include the desired test frequency or frequencies. In another embodiment, one or more notch filters are employed to isolate the desired test frequency or frequencies. Other frequency isolation techniques may be employed. Additionally, since the system may not have control over the frequency content of the sound and the electrical signal, the system may measure the levels at the reference and/or test frequencies, detect that the signal level is not sufficiently high to determine an ear seal measurement with acceptable confidence, and in response use measured levels at different reference and/or test frequencies for which the signal level of the sound is sufficiently high. The sound level measurements may be performed by a controller 17 of the hearing device (e.g., hearing device 13 of FIG. 7) and/or of the mobile audio device (e.g., mobile audio device 10 of FIG. 7). Operation proceeds to block 504.

At block 504, an electrical signal level difference is calculated between the reference frequency and test frequency components of the electrical signal. In one embodiment, multiple test frequencies are used, and multiple electrical signal level differences are calculated between the reference frequency component and the multiple test frequency components of the electrical signal. Additionally, acoustical signal levels of the reference frequency component and the test frequency component or components of the sound generated at block 502 are measured. Still further, one or more acoustical signal level differences are calculated between the measured acoustical signal level of the reference frequency component and the one or more measured acoustical signal levels of the test frequency components. Finally, one or more normalized acoustical difference values are calculated by subtracting the one or more electrical signal level differences from the respective one or more acoustical signal level differences. As described above, multiple test frequencies may be used with a given reference frequency to facilitate better discrimination of the ear seal quality under various conditions. For example, multiple normalized acoustical differences are calculated for different test frequencies and then statistically combined (e.g., averaged, weighted averaged) to generate a single normalized acoustical difference. Additionally, one or more test frequencies may be used with each of multiple reference frequencies to facilitate better discrimination of the ear seal quality under various conditions. The operations at block 504 may be performed by a controller of the hearing device and/or of the mobile audio device. Operation proceeds to block 506.

At block 506, an ear seal measurement is determined based on the normalized acoustical difference or differences calculated at block 504. In one embodiment, the normalized acoustical difference or differences are compared against thresholds associated with different ear seal qualities, or leak sizes. For example, a difference of X (e.g., −20) dBr may be associated with a leak size of Y (e.g., 0.01) millimeters. The threshold values may be established based on previously measured and calculated information such as the information shown in FIG. 2 and/or FIG. 3. In one embodiment, the thresholds are determined a priori for a given earphone model. In another embodiment, the thresholds are determined for a generic earphone, e.g., an expected value from a sample of different earphones tested. In one embodiment, at least one of the thresholds may be associated with a minimal friction force between the earphone and an ear canal that is required to keep the earphone within the ear canal without requiring additional support. In other words, the threshold corresponds to a condition in which the leak size is so large that the earphone is no longer held by friction in the ear canal and may be about to fall out absent additional support. Such a threshold may be helpful to define a leak size corresponding to a loosely inserted earbud condition. Leak sizes larger than that are not of concern and the earphone may be declared out of the ear canal for relevant purposes. In one embodiment, different thresholds may be associated with different insertion depths of the earphone within the ear canal. For example, a separate determination of insertion depth may be obtained (e.g., from high frequency response shape), and there may be a correlation between ear seal leak size and insertion depth such that the leak size determination according to embodiments described herein may be used as an independent confirmation of the insertion depth. In one embodiment, a trained machine learning module may perform the ear seal measurement determination. The machine learning module may receive and use the normalized acoustical differences calculated at block 504 and/or the sound levels measured at block 502. The received calculated normalized acoustical differences and/or measured sound levels may be provided as input to the machine learning module both during a training mode and during an operational mode. Operation proceeds to decision block 508.

At decision block 508, a determination is made whether the normalized acoustical difference calculated at block 504 (e.g., for a given test frequency) is less than a predetermined threshold, referred to as a "device out" threshold. If so, operation proceeds to block 512; otherwise, operation proceeds to block 514.

At block 512, an indication that the earphone is out of the ear canal is stored. The "device out" indication may be used as a trigger for other actions, e.g., as described with respect to block 514.

At block 514, an action is taken based on the ear seal measurement made at block 506 and/or the "device out" indication determined at blocks 508 and 512. The actions may include, but are not limited to: using the ear seal measurement and/or the "device out" indication to assist an ANC algorithm employed by the hearing device 13 and/or mobile audio device 10; adjust the playback quality and/or level; adjust the balance between the right and left earphones; adjust the equalization of the earphone, e.g., boost the bass level; display a message to the user, e.g., "earphone is out, please replace" or "ear seal quality low, please re-insert earphone." As described herein, in some embodiments the operations described with respect to FIG. 5 may be performed entirely by the hearing device 13 itself (e.g., controller 17 within the combox 16), whereas in other embodiments some of the operations may be performed by the mobile audio device 10 coupled to the hearing device 13.

Advantages of the embodiments described herein may include the following. Because program material or a musical chime signal, for example, may be used (e.g., the lowest guitar note is 80 Hz and the lowest bass note is 40 Hz), no infrasound probe signals are required. A reduction in measurement uncertainty may be avoided since the high-pass filter slope range of the internal microphone may be avoided (e.g., typical −3 dB frequency range for error microphones is 35 to 85 Hz). The embodiments may be used as a coarse measure of insertion quality for a generic, i.e., unknown, sealed earphone design. The use of multiple test and/or reference frequencies may allow fine-tuning for a given earphone and better confidence in the measurements. The embodiments may be fine-tuned to a great degree of seal assessment accuracy for a known earbud. For example, the embodiments may be used as a noisy independent, i.e., uncorrelated with other methods, measure of the insertion depth for ear biometrics and may be used to assist an ANC algorithm.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

The invention claimed is:

1. A system for evaluating an ear seal between an earphone of a hearing device and an ear canal, comprising:
  a first transducer configured to play sound into the ear canal in response to an electrical signal, wherein the electrical signal includes a reference frequency component and at least one test frequency component, wherein the sound includes a reference frequency component and at least one test frequency component, wherein the at least one test frequency is lower than the reference frequency;
  a second transducer configured to receive the sound in the ear canal; and
  a controller, configured to:
    calculate at least one electrical signal level difference between the reference frequency component and the at least one test frequency component of the electrical signal;
    measure acoustical levels of the reference frequency component and the at least one test frequency component of the sound in the ear canal;
    calculate at least one acoustical signal level difference between the measured acoustical level of the reference frequency component and the measured acoustical level of the at least one test frequency component;
    calculate at least one normalized acoustical difference value by subtracting the electrical signal level difference from the at least one acoustical signal level difference; and
    determine a measurement of the ear seal based on the at least one normalized acoustical difference value.

2. The system of claim 1,
  wherein to determine the measurement of the ear seal based on the at least one normalized acoustical difference value, the controller compares the at least one normalized acoustical difference value with at least one threshold value; and
  wherein the at least one threshold value corresponds to at least one level of an ear seal.

3. The system of claim 1,
  wherein to determine the measurement of the ear seal based on the at least one normalized acoustical difference value, the controller compares the at least one normalized acoustical difference value with at least one threshold value; and
  wherein the at least one threshold value corresponds to at least one insertion depth of the earphone into the ear canal.

4. The system of claim 1,
wherein to determine the measurement of the ear seal based on the at least one normalized acoustical difference value, the controller compares the at least one normalized acoustical difference value with at least one threshold value; and
wherein at least one of the one or more threshold values is associated with a friction force between the earphone and the ear canal similar to, or less than, that is required to maintain the earphone positioned within the ear canal without additional support.

5. The system of claim 1,
wherein the at least one test frequency comprises a plurality of test frequencies; and
wherein the controller determines the measurement of the ear seal based on a plurality of normalized acoustical difference values.

6. The system of claim 1,
wherein the reference frequency is at least 500 Hz.

7. The system of claim 1,
wherein the at least one test frequency is selected from a range between 50-200 Hz.

8. The system of claim 1,
wherein the electrical signal played as sound into the ear canal comprises playback of a recorded or streamed audio signal.

9. The system of claim 1,
wherein the system is wholly implemented on the hearing device.

10. The system of claim 1,
wherein the system is implemented partly on the hearing device and partly on a controller provided on a host device coupled with the hearing device.

11. The system of claim 1,
wherein the controller comprises a trained machine learning module arranged to determine the ear seal measurement based on the at least one normalized acoustical difference value and/or the measured acoustical levels.

12. A method for evaluating an ear seal between an earphone of a hearing device and an ear canal, comprising:
playing, by a first transducer of the earphone, sound into the ear canal in response to an electrical signal;
wherein the electrical signal includes a reference frequency component and at least one test frequency component;
wherein the sound includes a reference frequency component and at least one test frequency component;
wherein the at least one test frequency is lower than the reference frequency;
calculating at least one electrical signal level difference between the reference frequency component and the at least one test frequency component of the electrical signal;
measuring acoustical levels of the reference frequency component and the at least one test frequency component of the sound in the ear canal received by a second transducer of the earphone;
calculating at least one acoustical signal level difference between the measured acoustical level of the reference frequency component and the measured acoustical level of the at least one test frequency component;
calculating at least one normalized acoustical difference value by subtracting the electrical signal level difference from the at least one acoustical signal level difference; and
determining a measurement of the ear seal based on the at least one normalized acoustical difference value.

13. The method of claim 12,
wherein said determining a measurement of the ear seal based on the at least one normalized acoustical difference value comprises comparing the at least one normalized acoustical difference value with at least one threshold value; and
wherein the at least one threshold value corresponds to at least one level of an ear seal.

14. The method of claim 12,
wherein said determining a measurement of the ear seal based on the at least one normalized acoustical difference value comprises comparing the at least one normalized acoustical difference value with at least one threshold value; and
wherein the at least one threshold value corresponds to at least one insertion depth of the earphone into the ear canal.

15. The method of claim 12,
wherein said determining the measurement of the ear seal based on the at least one normalized acoustical difference value comprises comparing the at least one normalized acoustical difference value with at least one threshold value; and
wherein at least one of the one or more threshold values is associated with a friction force between the earphone and the ear canal similar to, or less than, that is required to maintain the earphone positioned within the ear canal without additional support.

16. The method of claim 12,
wherein the at least one test frequency comprises a plurality of test frequencies; and
wherein said determining the measurement of the ear seal is based on a plurality of normalized acoustical difference values.

17. The method of claim 12,
wherein the reference frequency is at least 500 Hz.

18. The method of claim 12,
wherein the at least one test frequency is selected from a range between 50-200 Hz.

19. The method of claim 12,
wherein said playing sound into the ear canal in response to the electrical signal comprises playback of a recorded or streamed audio signal.

20. The method of claim 12,
wherein the method is performed by a system or circuit wholly implemented on the hearing device.

21. The method of claim 12,
wherein the method is performed by a system or circuit; and
wherein the system or circuit is implemented partly on the hearing device and partly on a controller provided on a host device coupled with the hearing device.

22. The method of claim 12,
wherein the method is performed by a system or circuit comprising a trained machine learning module arranged to perform said determining the measurement of the ear seal based on the at least one normalized acoustical difference value and/or the measured acoustical levels.

23. A non-transitory computer-readable medium having instructions stored thereon that are capable of causing or configuring a system for evaluating a seal between an earphone of a hearing device and an ear canal or ear cavity to perform operations comprising:

playing, by a first transducer of the earphone, sound into the ear canal in response to an electrical signal;

wherein the electrical signal includes a reference frequency component and at least one test frequency component;

wherein the sound includes a reference frequency component and at least one test frequency component;

wherein the at least one test frequency is lower than the reference frequency;

calculating at least one electrical signal level difference between the reference frequency component and the at least one test frequency component of the electrical signal;

measuring acoustical levels of the reference frequency component and the at least one test frequency component of the sound in the ear canal received by a second transducer of the earphone;

calculating at least one acoustical signal level difference between the measured acoustical level of the reference frequency component and the measured acoustical level of the at least one test frequency component;

calculating at least one normalized acoustical difference value by subtracting the electrical signal level difference from the at least one acoustical signal level difference; and determining a measurement of the ear seal based on the at least one normalized acoustical difference value.

* * * * *